K. TOTH.
MIRROR.
APPLICATION FILED FEB. 28, 1911.
1,006,315.
Patented Oct. 17, 1911.
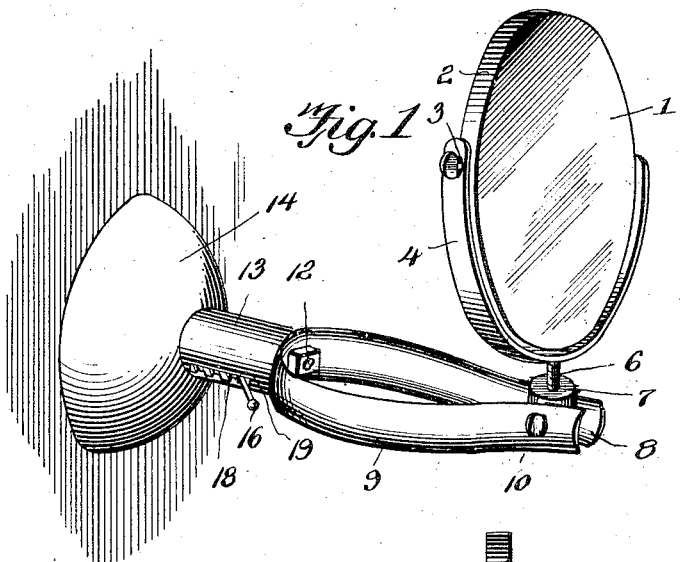
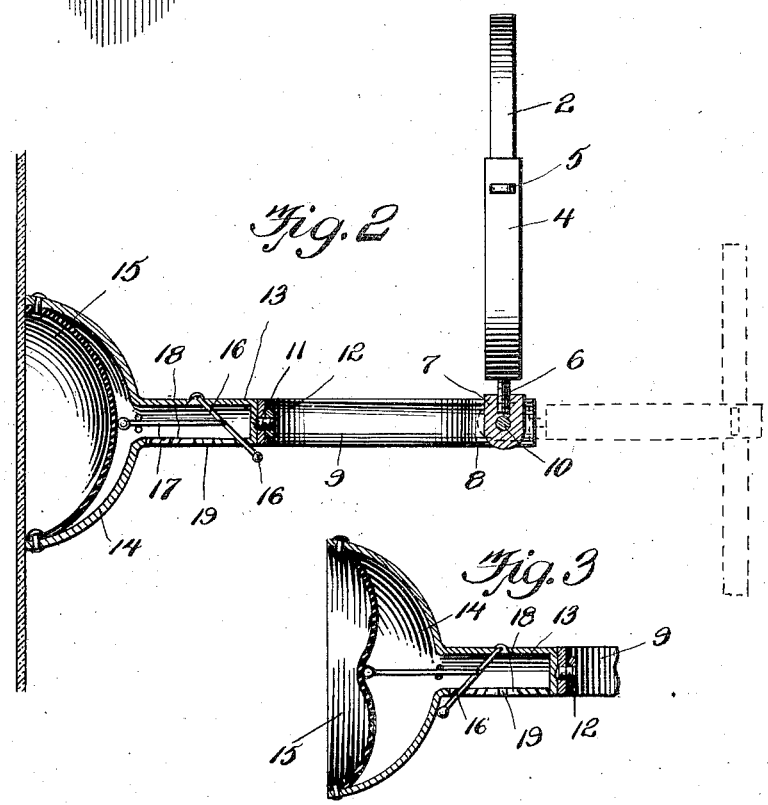
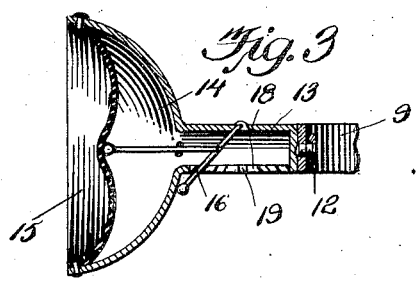
Inventor
Karl Toth
By Victor J. Evans
Attorney
Witnesses
W. S. McDowell
Wm. J. Toerth.

UNITED STATES PATENT OFFICE.

KARL TOTH, OF DETROIT, MICHIGAN.

MIRROR.

1,006,315.  Specification of Letters Patent.  Patented Oct. 17, 1911.

Application filed February 28, 1911. Serial No. 611,390.

*To all whom it may concern:*

Be it known that I, KARL TOTH, a citizen of the United States, residing at Detroit, in the county of Wayne and State of Michigan, have invented new and useful Improvements in Mirrors, of which the following is a specification.

This invention relates to improvements in mirrors and the primary object of the invention is the provision with the mirror of means whereby the said mirror may be brought to any angle or rotated in any direction, the said mirror being also provided with suction means whereby the same may be securely retained upon the side wall, ceiling or the like.

With the above, and other objects in view which will appear as the nature of the invention progresses, the invention resides in the novel construction and arrangement of parts hereinafter fully described and claimed.

In the accompanying drawings there has been illustrated a simple and preferred embodiment of the improvement, it being understood, however, that the showing therein is merely illustrative and other changes as to size, shape, proportion, etc., within the scope of the appended claim, may be made if desired.

In the accompanying drawings: Figure 1 is a perspective view of the mirror constructed in accordance with the present invention and showing the same secured to a wall or other vertical support. Fig. 2 is a central longitudinally sectional view of the same. Fig. 3 is a detailed sectional view taken through the base of the device and showing the suction cup in its normal position.

In the accompanying drawings the numeral 1 designates the mirror. This mirror 1 may be of any desired size or shape, in the drawings the same being illustrated as oval. The edge of the mirror is preferably provided with a reinforcing band 2, the same conforming to the shape of the mirror and being provided at diametrically opposite points with outwardly projecting studs or pintles 3. Adapted for pivotal connection with the said studs 3 is a yoke 4. This yoke has its arms adjacent their ends bifurcated or constructed of a pair of members, the said members being yielding and being provided with registering openings which are adapted for the reception of a binding element, such as a screw 5, and whereby the mirror may be sustained at any desired angle in relation to yoke 4. The central portion of the yoke is formed with a depending stud 6, the latter adapted to be received within the bore of the cross sectional oval shaped member 7. The member 7 is provided with means whereby the stud 6 may be effectively sustained therein, the said means preferably comprising a thumb screw, and the oval or curved sides of the member 7 are adapted to be received within the upper cross sectional curved extensions 8 provided upon the main body of the support 9. The member 7 is formed with a transversely arranged opening and the members 8 are provided with a compressing element 10, such as a screw or the like, and whereby the said members may be brought continuing into engagement with the member 7 to sustain the same between the extensions 8 in a vertical position or to retain the yoke 4 at an inclination with regards to the body 7.

The body member 9 is constructed of a single piece of resilient material, the same bent upon itself to provide oppositely arranged vertically extending arms and the arm extension 8. The lower portion of the said body is formed with a threaded opening 11, and this opening is adapted to coact with a reduced threaded portion 12 formed upon a sleeve 13. This sleeve 13 may be connected with or may be formed interiorly with the bowl shaped base 14 of the device. The base 14 as well as its sleeve 13 are both constructed of some suitable hardened material such as metal, and positioned within the base and securely connected thereto is an elastic member 15. The member 15 comprises a suction cup whereby the mirror may be effectively retained upon any desired support. The sleeve 13 is hollow and is provided upon one of its sides with an elongated slot, the same being adapted to receive the projecting end of a pivoted handle 16. This handle is formed with a depending arm 17, and the said arm is preferably secured to the top of the cup 15. The side walls provided by the elongated slot 18 of the sleeve are formed with teeth 19 and the handle 16 is adapted to be swung into engagement with any of the teeth so that the pressure upon the cup is thereby controlled and the said cup retained in this compressed condition.

From the above description, taken in connection with the accompanying drawings the simplicity of the device, as well as its advantages will, it is thought be apparent to those skilled in the art to which such inventions appertain it being noted that the mirror may be swung in any desired direction, that the mirror may be inclined as desired and that the pressure upon the suction cup may be readily regulated or that the said pressure may be entirely relieved so that the device may be conveyed from place to place as desired.

Having thus described the invention what I claim as new is:—

A support of the class described comprising a bowl shaped base having an integrally formed centrally arranged extending sleeve, said sleeve being provided with an elongated slot, the walls of which being provided with teeth, a handle pivotally connected with the sleeve and adapted to project from the slot to engage with one of the teeth formed in the walls thereof, an arm pivotally connected with the handle, a resilient suction cup secured to the bowl shaped base, and a connection between the arm and the said suction cup, substantially as and for the purpose set forth.

In testimony whereof I have affixed my signature in presence of two witnesses.

KARL TOTH.

Witnesses:
PETER DEMCLINK,
SAM KOVACS.